Oct. 16, 1923.
Z. CALHOON
VEHICLE POWER JACK
Filed April 13, 1923
1,470,808
3 Sheets-Sheet 1
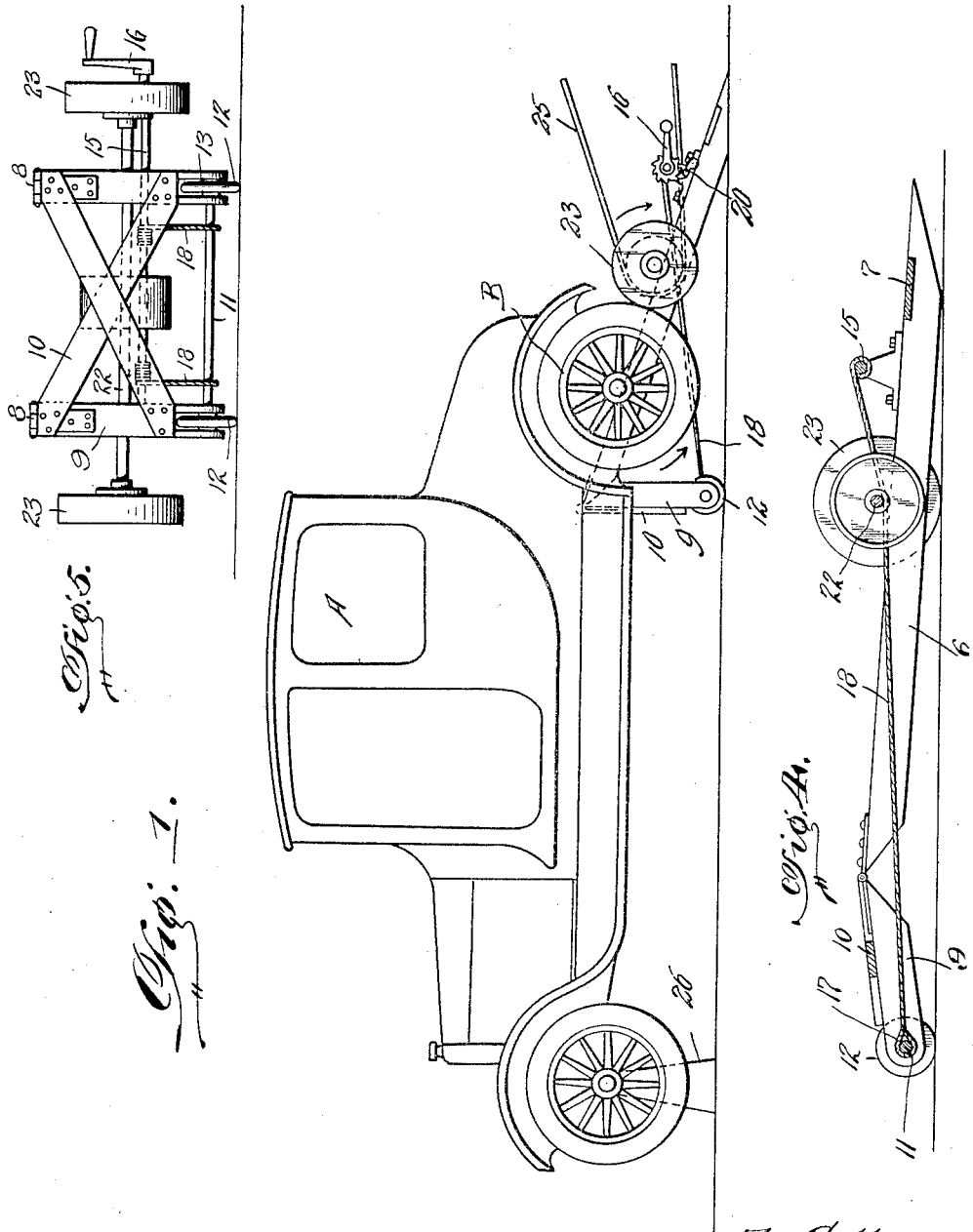
WITNESSES
Z. Calhoon,
INVENTOR.
ATTORNEYS.

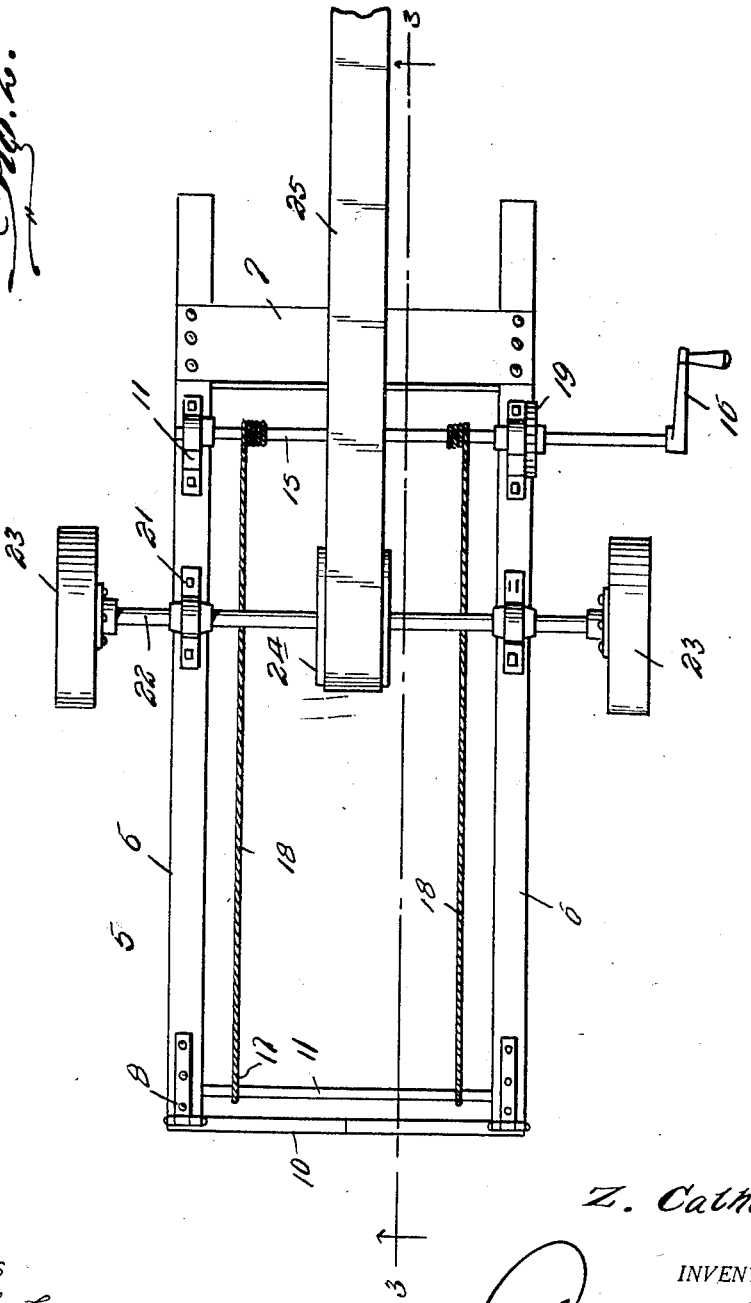

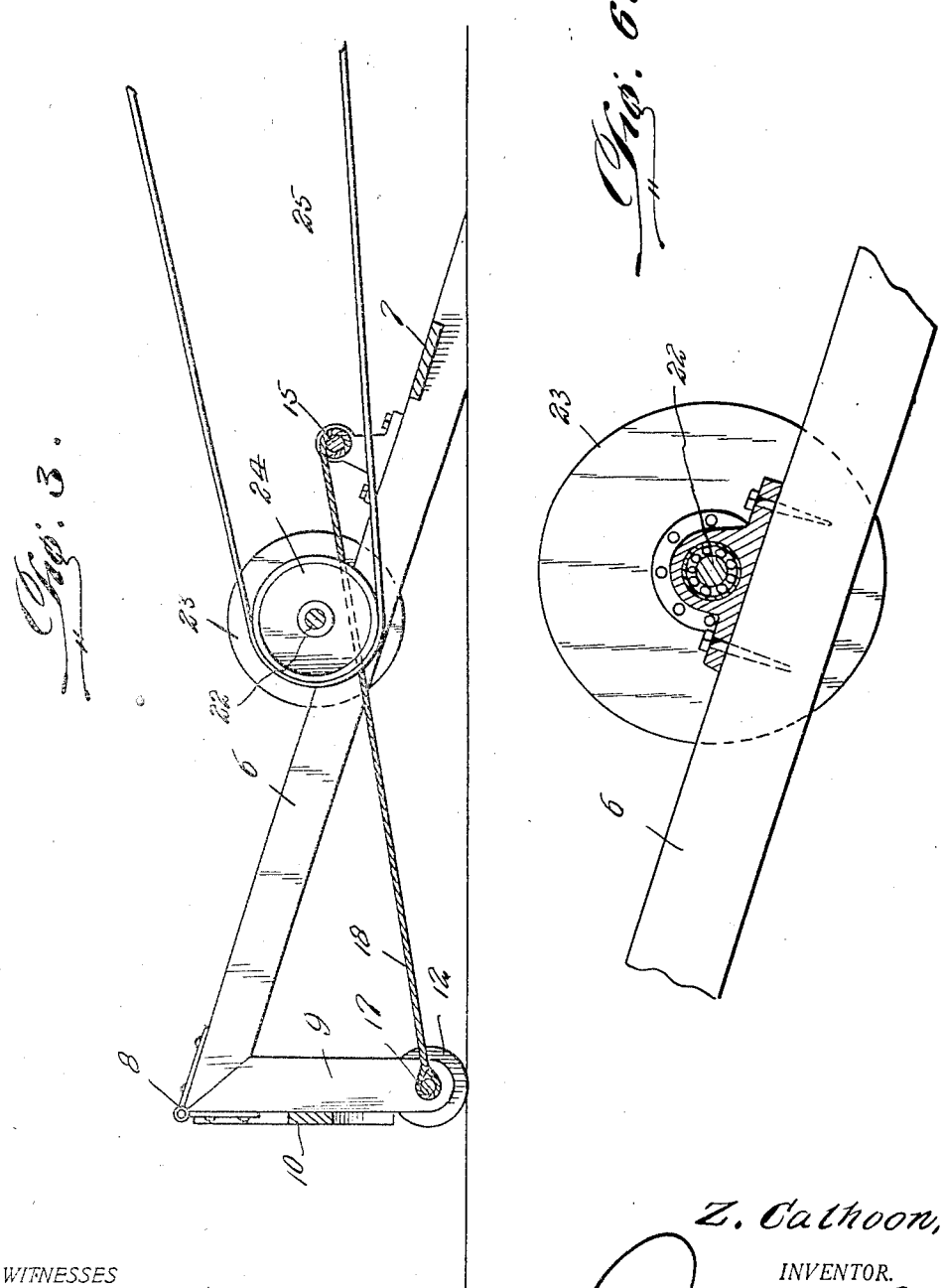

Patented Oct. 16, 1923.

1,470,808

UNITED STATES PATENT OFFICE.

ZEDDOCK CALHOON, OF LUTON, IOWA.

VEHICLE POWER JACK.

Application filed April 13, 1923. Serial No. 631,820.

*To all whom it may concern:*

Be it known that I, ZEDDOCK CALHOON, a citizen of the United States, residing at Luton, in the county of Woodbury and State of Iowa, have invented certain new and useful Improvements in Vehicle Power Jacks, of which the following is a specification.

In carrying out the present invention, it is my purpose to provide a highly improved form of power jack for permitting all types of motor vehicles to be employed for driving widely varying types of machines, my invention being characterized by its simplicity of construction, durability and efficiency, and one that may be positioned in a minimum amount of time.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a side elevation of a well-known form of pleasure vehicle in position upon my improved jack.

Figure 2 is a top plan view of a jack, per se.

Figure 3 is a side elevation of the jack in raised position.

Figure 4 is a similar view of the jack in a collapsed position.

Figure 5 is a front end elevation of Figure 3, and

Figure 6 is an enlarged detail fragmentary cross section through a portion of the jack.

Referring to the drawings in detail, my improved power jack comprises a main frame 5 consisting of spaced longitudinal side bars 6, rigidly connected together adjacent their inner ends by a cross board 7. The ends of these bars 6 adjacent this cross board 7 are bevelled upon their undersides, as more clearly shown in Figures 3 and 4, for permitting of a wide area of contact of the side bars with the ground surface when this frame is extended to the inclined position of Figures 3 and 6, in a manner presently to be set forth.

Upon the front end of the frame 5, and hingedly secured at 8 to the side bars 6 are supporting legs 9, the adjacent ends of the legs and side bars being bevelled for providing in reality a mitre joint therebetween when these legs are extended for raising the front end of the frame in a manner to be hereinafter described. These legs 9 may be and preferably are interconnected by cross bars 10, while spanning these legs at the lower end thereof is a stationary axle 11, journaled upon the opposite ends of which are wheels 12, that extent within slots 13 formed upon the lower ends of said legs 9. Journaled within bearings 14 upon the side bars 6 of the frame 5 and slightly forwardly of the cross board 7 is a shaft, one end of which projects outwardly of the adjacent side bar 6, and is equipped with an operating handle 16. Rigidly secured at one end to the stationary axle 11 of the legs 9, through the medium of loops 17 are the front ends of cables 18, the same extending rearwardly and being in turn secured to said shaft 15, whereby a rotation of this shaft in one direction will wind the cables 18 thereon, for consequently moving the legs to an upright position for raising the rear end of the automobile A into the position of Figure 1.

For preventing retrograde movement of the shaft 15 and the consequent collapsing of the jack, the shaft 15 is provided with a ratchet wheel 19, the teeth of which are engaged with a pivoted and weighted dog 20 upon the adjacent bearing 14, this dog being of course displaceable for permitting retrograde movement of the shaft when desirable.

Forwardly of the shaft 15, and journaled within bearings 21 is a cross shaft 22, the ends of which project outwardly of the frame 5, and are equipped with drive pulleys 23, the rims of which are relative of wide area, and are adapted to be contacted by the tires of the usual rear wheels B of the vehicle A. This shaft 22 is centrally equipped with a pulley 24, over which is to be trained an endless belt 25, that is extended rearwardly and in turn trained over the pulley of the power shaft of the machine to be driven.

In practice, the device is collapsed to the position of Figure 4 for permitting the same to be extended beneath the vehicle A until the drive wheels 23 are in close contact with the tires of said vehicle wheel. The handle 16 is then rotated for consequently winding the cables 18 upon the shaft 15 for swinging the supporting legs in a rearward direction, which will consequently raise the front end of the frame for thereby lifting the vehicle. It is preferable that the front end of the vehicle be supported by blocks or by similar means 26, for maintaining the machine level and it will be of course obvious that when the rear wheels are rotated, a similar motion will be imparted to the shaft 22, for driving the belt 25.

In view of the above description, it is believed by me that the advantages of a device of this character will be readily appreciated by those skilled in the art, and although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters Patent, is:

1. In a vehicle power jack of the class described, a frame, supporting legs hingedly secured upon the front end of said frame, means for extending said supporting legs to a vertical position for raising the front end of the frame, a shaft journaled across said frame, drive wheels upon the opposite ends of the shaft adapted to be engaged by the vehicle wheels, and a belt pulley upon said shaft.

2. In a vehicle power jack of the class described, a frame, supporting legs pivoted upon the front end of the frame, means for moving said legs to a vertical position for raising the front end of the frame, a shaft journaled across said frame and adapted to be driven through the rotation of the wheels of the vehicle upon said jack, and a belt pulley upon said shaft.

3. In a vehicle power jack of the class described, a frame, supporting legs pivoted to the front end of said frame, means for moving said legs to a vertical position for consequently raising the front end of the frame, ground wheels journaled within the lower ends of said legs, a cross shaft upon said frame, drive wheels upon the opposite ends of said cross shaft, and adapted to be engaged by the wheels of the vehicle whereby said shaft is rotated when said wheels are moved, and a belt pulley keyed to said shaft.

In testimony whereof I affix my signature.

ZEDDOCK CALHOON.